Feb. 26, 1924.
A. DOBROWOLSKI
1,484,876
COMBINATION TRICYCLE AND GOCART
Filed July 26, 1920    2 Sheets-Sheet 1
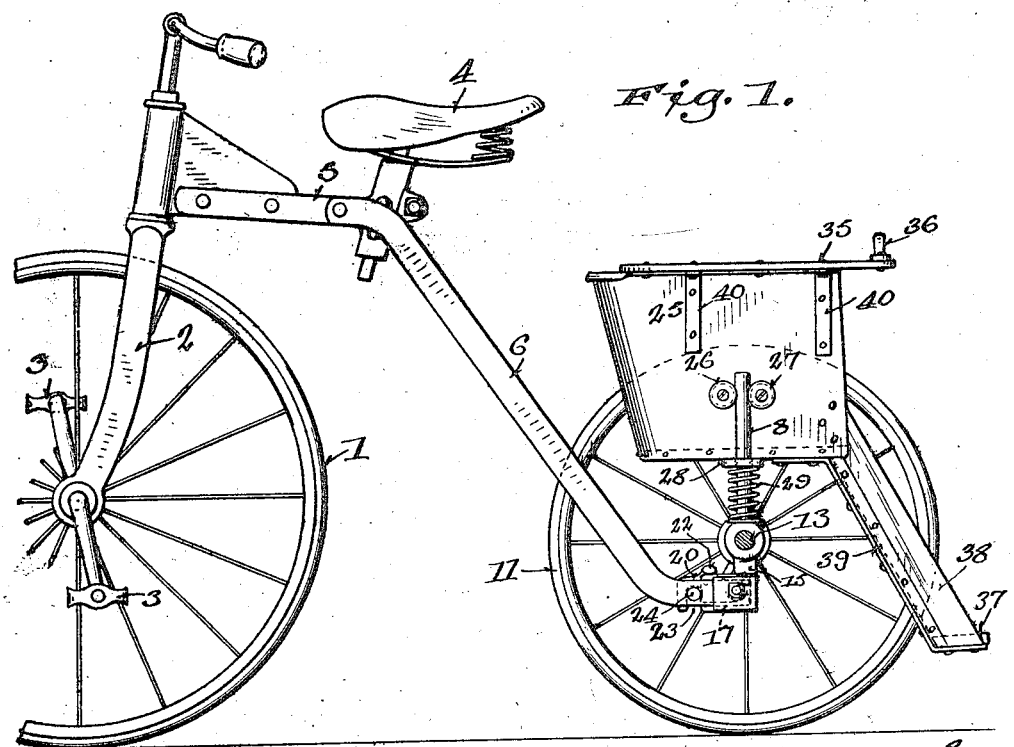
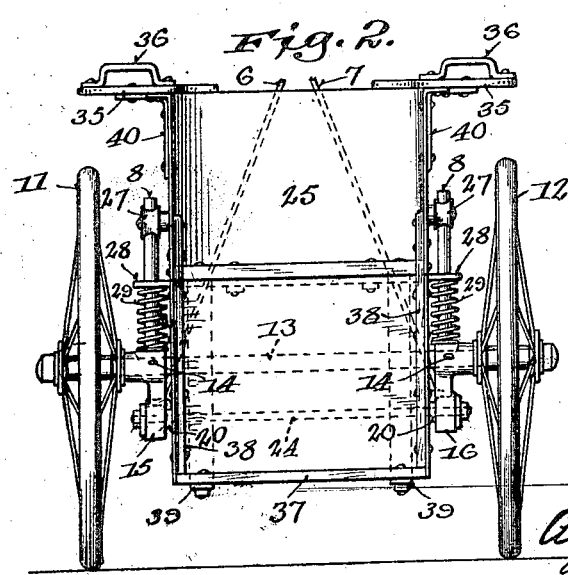
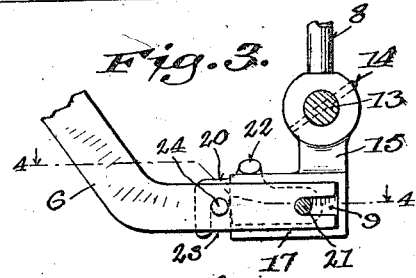
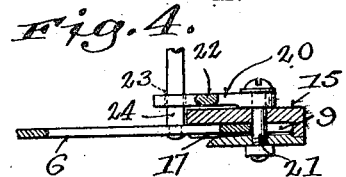
INVENTOR.
Alfons Dobrowolski
BY
Erwin Wheeler & Woolard
ATTORNEYS.

Feb. 26, 1924.
1,484,876
A. DOBROWOLSKI
COMBINATION TRICYCLE AND GOCART
Filed July 26, 1920
2 Sheets-Sheet 2

Alfons Dobrowolski
INVENTOR.

BY
Erwin Wheeler & Woolard
ATTORNEYS.

Patented Feb. 26, 1924.

1,484,876

UNITED STATES PATENT OFFICE.

ALFONS DOBROWOLSKI, OF RACINE, WISCONSIN.

COMBINATION TRICYCLE AND GOCART.

Application filed July 26, 1920. Serial No. 398,949.

*To all whom it may concern:*

Be it known that I, ALFONS DOBROWOLSKI, a citizen of the United States, residing at Racine, county of Racine, and State of Wisconsin, have invented new and useful Improvements in Combination Tricycles and Gocarts, of which the following is a specification.

My invention relates to improvements in tricycles.

The object of my invention is to provide in simple form means for converting a tricycle into a go-cart. In accomplishing this object I use a tricycle having a rear seat attachment such as is disclosed in my pending application filed November 25, 1918, Serial No. 263,959. By unhooking from the rest of the tricycle its rear wheels and axle with the auxiliary seat attached and by fastening to the portion thus removed a handle whereby it may be guided, I can create a serviceable and comfortable go-cart.

A second object of my invention is to provide a tricycle which may be used either in that form or as a go-cart with no suggestion in either case of the duplex character of the vehicle. Neither vehicle is a makeshift, for my invention simply enables me to use in a natural manner a single axle and pair of wheels for two distinct purposes. Thus a family can have the benefit and enjoyment of both vehicles at substantially the cost of one.

In the drawings:

Figure 1 is a side view of my improved tricycle, with an auxiliary seat mounted upon the rear axle.

Figure 2 is a rear view showing the seat and mounting.

Figure 3 is a side view of the locking device by which the rear axle is secured to the tricycle frame, and whereby it is rendered quickly removable.

Figure 4 is a view, taken on line 4—4 of Figure 3.

Like parts are identified by the same reference characters thruout the several views.

Figure 5:
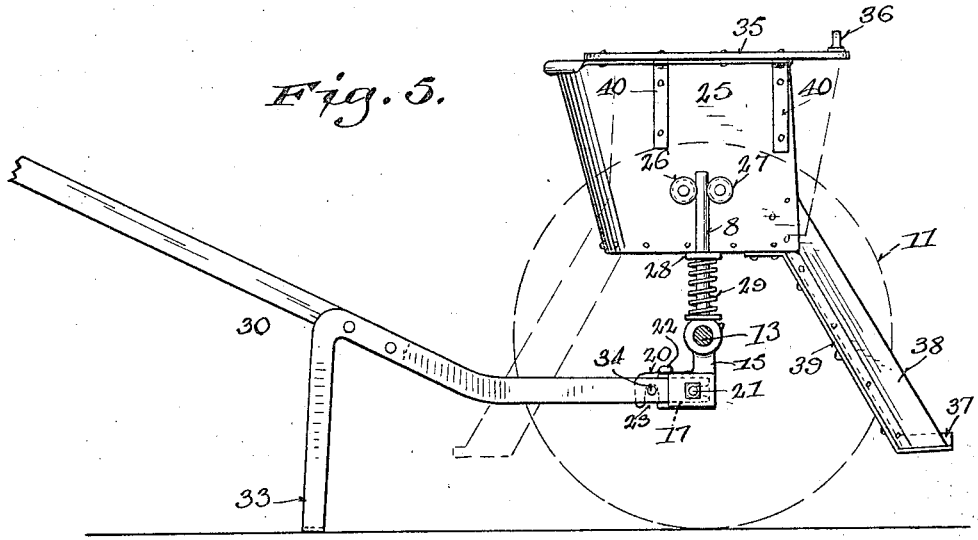
Figure 5 is a side view of the go-cart into which the tricycle parts may be converted.
Figure 6:
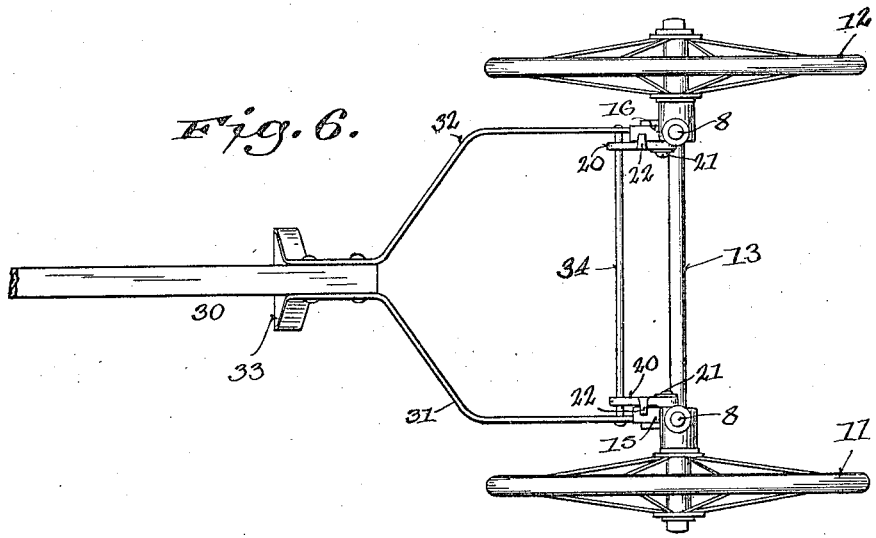
Figure 6 is a plan view of the same.

The drawings disclose a tricycle which is in many respects similar to those in common use. The front wheel 1, the fork 2, which supports the pedals 3, by which it is propelled, and the seat 4, are arranged in the customary manner upon the frame 5.

The rear fork arms 6 and 7, which are supported from the rear axle, are slightly modified in conformity with my invention. Their lower extremities are provided with substantially horizontal extensions, and each is provided at its extremity with a horizontally extending open ended slot, the purpose of which will be hereinafter explained. The rear wheels 11 and 12 are mounted to rotate freely upon an axle 13, to which is secured, by pins 14, a pair of bracket members 15 and 16, one adjacent to each wheel. Said members are each provided in their lower portions with a recess 17, which is adapted to receive the end of one of the divergent frame arms 6 and 7. Across this recess and extending thru the bracket members 15 and 16 from side to side are the bolts 21 which are received into the slots 9 in the divergent frame bars 6 and 7 when the latter are in place in the recess. The construction is such that when the frame arms are socketed within their respective recesses they fit snugly enough to resist any tendency of the axle to turn with the wheels and in fact any relative movement whatever between the frame and the brackets. Pivoted on bolts 21 at the inner side of each bracket member are the small latches 20. Each latch is provided with an outwardly projecting lip 22, which engages the bracket to prevent the latch from swinging downwardly beyond a horizontal position. The latches are provided with slots 23 near their outer ends which are adapted to swing over and engage a bracing rod 24, which spaces the divergent frame arms 6 and 7 and holds them in the same relative position.

The upper portions of brackets 15 and 16 are round in cross section and form supporting rods 8 for the seat 25. This seat is simply constructed, and may be made of sheet metal, or in any other preferred manner. It is provided with an arm rest 35 and a foot rest 37. Upon each arm rest is a handgrip 36. Across the bottom of the seat is a supporting brace 28, provided with holes at its outer ends to receive the supporting rods above referred to. There are also provided small rollers 26 and 27 with grooved peripheries mounted upon the sides of the seat, between which the supporting rods 8 are adapted to pass, and move freely in a relative vertical direction.

The seat here shown is of simple construction, being basket like in shape with a wooden bottom and sheet metal back and sides. The foot rest supports 38, as shown, are of wood with a metal re-inforcement at 39. Other metal braces 40 support the arm rests. Any form of auxiliary seat may be used, provided only that it is adapted to be supported entirely from the rear axle of a tricycle. For resilience, I provide springs 29. It is clear that the seat may be lifted from the tricycle, and replaced thereon with the utmost facility. As the seat is lifted upward the supports 8 slide out from between rollers 26 and 27 and thru the holes in brace 28. Furthermore, the seat may be so placed upon its supports as to face either forward or backward at the option of the owner.

When it is desired to convert the machine into a go-cart the latch 20 may be lifted from engagement with the bracing rod 24, and the frame arms 6 and 7 will then slide readily from the recesses 17 in brackets 15, leaving the rear wheels, axle, seat supporting brackets, and seat as a separate unit. In place of the tricycle frame, the handle 30 may now be attached, it being provided with divergent arms 31 and 32 and cross brace 34, which serve to replace the frame arms 6 and 7 and cross brace 24 of the tricycle. The forward portion of the strap metal comprising these arms 31 and 32 is bent downwardly in the form of a flattened loop 33, which serves as a rest to support the go-cart in an upright position.

I claim:

1. The combination in a tricycle having a frame provided with divergent supporting arms spaced apart at their outer ends by a bracing rod, of a pair of rear wheels, an axle therefor, a seat resiliently supported from said axle, and means for detachably securing to said axle the rear portion of a tricycle frame, said means comprising two brackets carried by the axle, recesses therein adapted to receive the ends of the frame, and a latch pivoted to said brackets and adapted to engage said bracing rod adjacent to each arm of the tricycle frame.

2. The combination in a tricycle having a frame provided with divergent supporting arms, of a rear wheel unit adapted to be detachably secured to said arms, said unit comprising a pair of wheels, an axle, brackets mounted upon the axle, means for resiliently supporting a seat upon the brackets and means carried by said brackets for locking the whole unit to the tricycle frame arms in operative position.

3. In a tricycle a detachable unit comprising an axle, a pair of wheels mounted to rotate thereon, a pair of brackets secured to the axle adjacent to the wheels, means for resiliently supporting a seat from said brackets and means carried by said brackets for interchangeably uniting the said unit with other units whereby a plurality of vehicles may be formed.

4. In a tricycle including a detachable unit comprising the rear axle and wheels, said unit being adapted for use in another vehicle, fittings secured to said axle and provided with upwardly extending rods, a seat guided by said rods and resiliently supported above said axle thereof, and means integral with said fittings and beneath said axle for securing said unit interchangeably to other units.

5. A vehicle unit comprising an axle, a pair of wheels mounted to rotate thereon, a seat supported from said axle, and latches carried by the axle adjacent to the wheels for securing said unit interchangeably to other units, whereby a plurality of vehicles may be formed.

6. A vehicle unit comprising an axle, a pair of wheels mounted thereon, a seat supported from said axle and means for securing said unit interchangeably to other units whereby a plurality of vehicles may be formed, said securing means comprising a recessed bracket and a latch.

7. The combination with a unit comprising the rear wheels and axle of a tricycle, brackets upon said axle and a seat supported from the brackets, of a tricycle frame provided with rear fork arms, horizontal projections at the ends of the fork arms, a spacing rod connecting said arms, and means whereby said rod may be utilized in detachably securing said horizontal projections to the brackets upon said axle.

8. The combination with a tricycle unit comprising an axle, wheels mounted thereon, a pair of brackets fastened to said axle, and a seat borne thereon, of a tricycle frame having rearwardly projecting arms notched at their ends and provided with a cross bar adapted for interlocking engagement with said brackets, and of a guiding handle also having rearwardly projecting arms notched at their ends and provided with a cross bar adapted for interlocking engagement with said brackets, said guiding handle being adapted for use interchangeably with said tricycle frame.

In testimony whereof I affix my signature in the presence of two witnesses.

ALFONS DOBROWOLSKI.

Witnesses:
ADOLPH ZABOROWSKI,
VICTOR J. DUBOWSKI.